(12) United States Patent
Algarni et al.

(10) Patent No.: US 10,853,944 B2
(45) Date of Patent: Dec. 1, 2020

(54) SYSTEM AND METHOD FOR FREE-BOUNDARY SURFACE EXTRACTION

(71) Applicant: King Abdullah University of Science and Technology, Thuwal (SA)

(72) Inventors: Marei Algarni, Thuwal (SA); Ganesh Sundaramoorthi, Thuwal (SA)

(73) Assignee: KING ABDULLAH UNIVERSITY OF SCIENCE AND TECHNOLOGY, Thuwal (SA)

( * ) Notice: Subject to any disclaimer, the term of this patent is extended or adjusted under 35 U.S.C. 154(b) by 119 days.

(21) Appl. No.: 16/094,546

(22) PCT Filed: Apr. 18, 2017

(86) PCT No.: PCT/IB2017/052218
§ 371 (c)(1),
(2) Date: Oct. 18, 2018

(87) PCT Pub. No.: WO2017/182952
PCT Pub. Date: Oct. 26, 2017

(65) Prior Publication Data
US 2019/0122366 A1 Apr. 25, 2019

Related U.S. Application Data

(60) Provisional application No. 62/324,083, filed on Apr. 18, 2016.

(51) Int. Cl.
*G06T 7/11* (2017.01)
*G06T 7/149* (2017.01)
(Continued)

(52) U.S. Cl.
CPC ............... *G06T 7/11* (2017.01); *G06T 5/002* (2013.01); *G06T 7/0012* (2013.01); *G06T 7/12* (2017.01);
(Continued)

(58) Field of Classification Search
CPC ....... G06T 2201/00; G06T 2207/20112; G06T 7/11; G06T 7/149
See application file for complete search history.

(56) References Cited

U.S. PATENT DOCUMENTS

| | | | |
|---|---|---|---|
| 8,488,852 B2 * | 7/2013 | Gupta | G06T 7/136 382/128 |
| 2005/0047655 A1 * | 3/2005 | Luo | G06K 9/0061 382/167 |

(Continued)

OTHER PUBLICATIONS

Ardon, et al., "A New Implicit Method for Surface Segmentation by Minimal Paths in 3D Images", Applied Mathematics Optimization, 2007, 127-144.

(Continued)

*Primary Examiner* — John J Lee
(74) *Attorney, Agent, or Firm* — Billion & Armitage; Michael A. Collins

(57) ABSTRACT

A method of extracting surfaces in three-dimensional data includes receiving as inputs three-dimensional data and a seed point p located on a surface to be extracted. The method further includes propagating a front outwardly from the seed point p and extracting a plurality of ridge curves based on the propagated front. A surface boundary is detected based on a comparison of distances between adjacent ridge curves and the desired surface is extracted based on the detected surface boundary.

15 Claims, 15 Drawing Sheets

(51) Int. Cl.
  *G06T 7/12* (2017.01)
  *G06T 7/162* (2017.01)
  *G06T 5/00* (2006.01)
  *G06T 7/00* (2017.01)

(52) U.S. Cl.
  CPC .............. *G06T 7/149* (2017.01); *G06T 7/162* (2017.01); *G06T 2201/00* (2013.01); *G06T 2207/20112* (2013.01); *G06T 2207/30048* (2013.01)

(56) References Cited

U.S. PATENT DOCUMENTS

2016/0245644 A1\* 8/2016 Yamamoto ............. G01B 11/24
2017/0140529 A1\* 5/2017 Yoshida .................. G06T 7/136

OTHER PUBLICATIONS

Benmansour, et al., "From a Single Point to a Surface Patch by Growing Minimal Paths", Springer-Verlag Berlin Heidelberg, 2009, 648-659.
Boykov, et al., "Interactive Graph Cuts for Optimal Boundary & Region Segmentation of Objects in N-D Images", Proceedings of "Internation Conference on Computer Vision", Jul. 2001, 1-8.
Caselles, et al., "Geodesic Active Contours", International Journal of Computer Vision, 1997, 61-79.
Chan, et al., "Active Contours Without Edges", IEEE Transactions on Image Processing, Feb. 2001, 266-277.
Cohen, "Global Minimum for Active Contour Models: A Minimal Path Approach", International Journal of Computer Vision 24(1), 1997, 57-78.
Grady, et al., "Minimal Surfaces Extend Shortest Path Segmentation Methods to 3D", IEEE Transactions on Pattern Analysis and Machine Intelligence, 2010, 1-14.
Hale, et al., "Fault surfaces and fault throws from 3D seismic images", 2012, 1-5.
Kaul, et al., "Detecting Curves with Unknown Endpoints and Arbitrary Topology Using Minimal Paths", IEEE Transactions on Pattern Analysis and Machine Intelligence, Oct. 2012, 1952-1965.
Mille, et al., "Combination of piecewise-geodesic paths for interactive segmentation", International Journal of Computer Vision manuscript No. 2015, 1-22.
Ochs, et al., "iPiasco: Inertial Proximal Algorithm for strongly convex Optimization", Jan. 2015, 1-20.
Osher, et al., "Fronts Propagating with Curvature Dependent Speed: Algorithms Based on Hamilton-Jacobi Formulations", 1988, 12-49.
Pock, et al., "A Convex Formulation of Continuous Multi-label Problems", 2008, 792-805.
Rother, et al., ""GrabCut"—Interactive Foreground Extraction using Iterated Graph Cuts", 2004, 1-6.
Schultz, "Crease Surfaces: From Theory to Extraction and Application to Diffusion Tensor MRI", IEEE Transaction on Visualization and Computer Graphics, Jan./Feb. 2010, 109-119.
Sethian, "A fast marching level set method for monotonically advancing fronts", Feb. 1996, 1591-1595.
Yezzi, et al., "A Geometric Snake Model for Segmentation of Medical Imagery", IEEE Transactions on Medical Imaging, Apr. 1997, 199-209.
Algarni, "SurfCut: Free-Boundary Surface Extraction", Network and Parallel Computing; Lecture Notes in Computer Science; Lect. Notes Computer, Springer International Publishing, Cham,, Sep. 16, 2016, 171-186.
Sun, et al., "Surface matching by 3D point's fingerprint", Proceedings of the Eighth IEEE International Conference on Computer Vision. (ICCV). Vancouver, British Columbia, Canada, vol. 2, Jul. 7, 2001, 263-269.
Withey, et al., "Dynamic edge tracing: Boundary identification in medical images", Computer Vision and Image Understanding, Academic Press, US, vol. 113, No. 10, Oct. 1, 2009, 1039-1052.
Notification of Transmittal of the International Search Report and the Written Opinion of the International Searching Authority, or the Declaration for PCT/IB2017/052218 dated Aug. 3, 2017.

\* cited by examiner

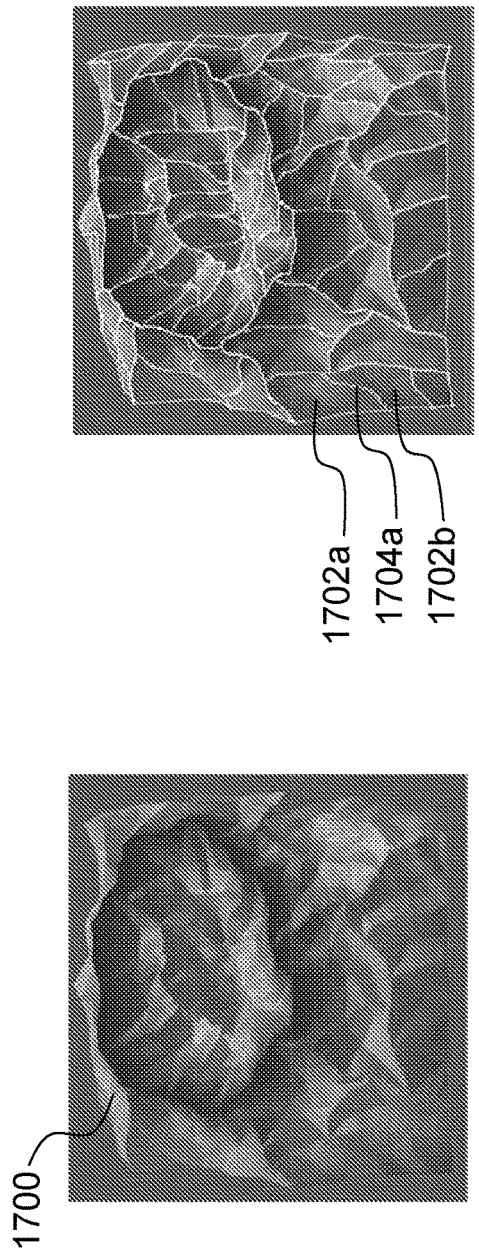
Figure 17b
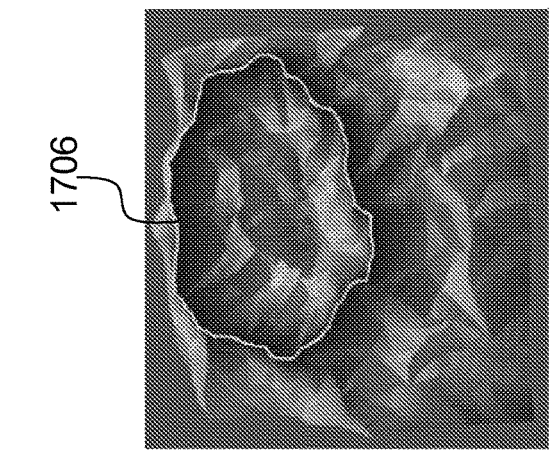
Figure 17e
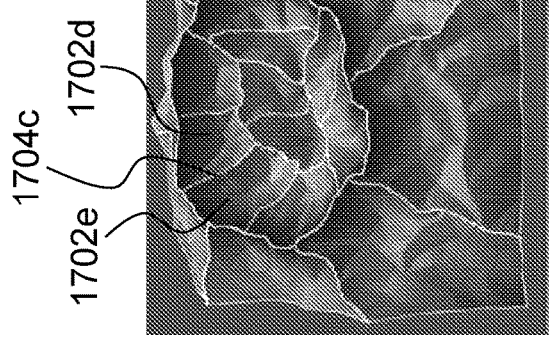
Figure 17d
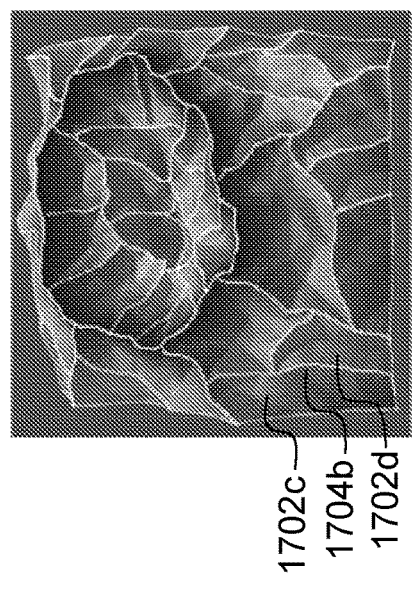
Figure 17c
Figure 17a

SYSTEM AND METHOD FOR FREE-BOUNDARY SURFACE EXTRACTION

CROSS-REFERENCE TO RELATED APPLICATIONS

This application is a National Stage Application of International Application No. PCT/IB2017/052218, filed on Apr. 18, 2017, titled "SYSTEM AND METHOD FOR FREE-BOUNDARY SURFACE EXTRACTION", which claims benefit of U.S. Provisional Application No. 62/324,083, filed on Apr. 18, 2016, titled "SYSTEM AND METHOD FOR FREE-BOUNDARY SURFACE EXTRACTION", both of which are incorporated herein by reference in their entirety. A claim of priority to all, to the extent appropriate, is made.

TECHNICAL FIELD

The present disclosure is related generally to a method of extracting a smooth, simple surface with unknown boundaries from a noisy three-dimensional image.

BACKGROUND

Minimal path methods have been utilized in computer vision applications to extract continuous curves without interruptions from noisy images. For example, these methods have been utilized for edge detection applications and object boundary detection. These techniques have been generalized to extract the equivalent of edges in three-dimensional (3D) images, which form surfaces. For example, these methods have been applied to extract a surface with a boundary that forms a three-dimensional curve, called a free-boundary. Extraction of these surfaces may be utilized in a variety of applications, such as medical imaging (e.g., imaging of the outer walls of the ventricles), scientific imaging (e.g., fault surfaces in seismic images), and others. However, existing approaches to 3D surface extraction requires the user to provide the boundary of the surface, which is a time-intensive process.

Therefore, it would be advantageous to develop a method for extracting surfaces that does not require the user to provide the boundary of the surface.

BRIEF DESCRIPTION OF THE DRAWINGS

FIGS. 17a-17e are images illustrating ridge extraction based on the steps described with respect to FIG. 16.

DETAILED DESCRIPTION

The present invention provides a system and method for extracting a surface with unknown boundary in a three-dimensional (3D) image. In particular, the present invention requires a user to provide as an input a single seed point (rather than requiring the user to define the boundary of the surface). A benefit of the present invention is the ability to extract the surface despite noisy local measurement of the surface (e.g., edges), and at a lower computational cost than that of competing systems.

Figure 1:
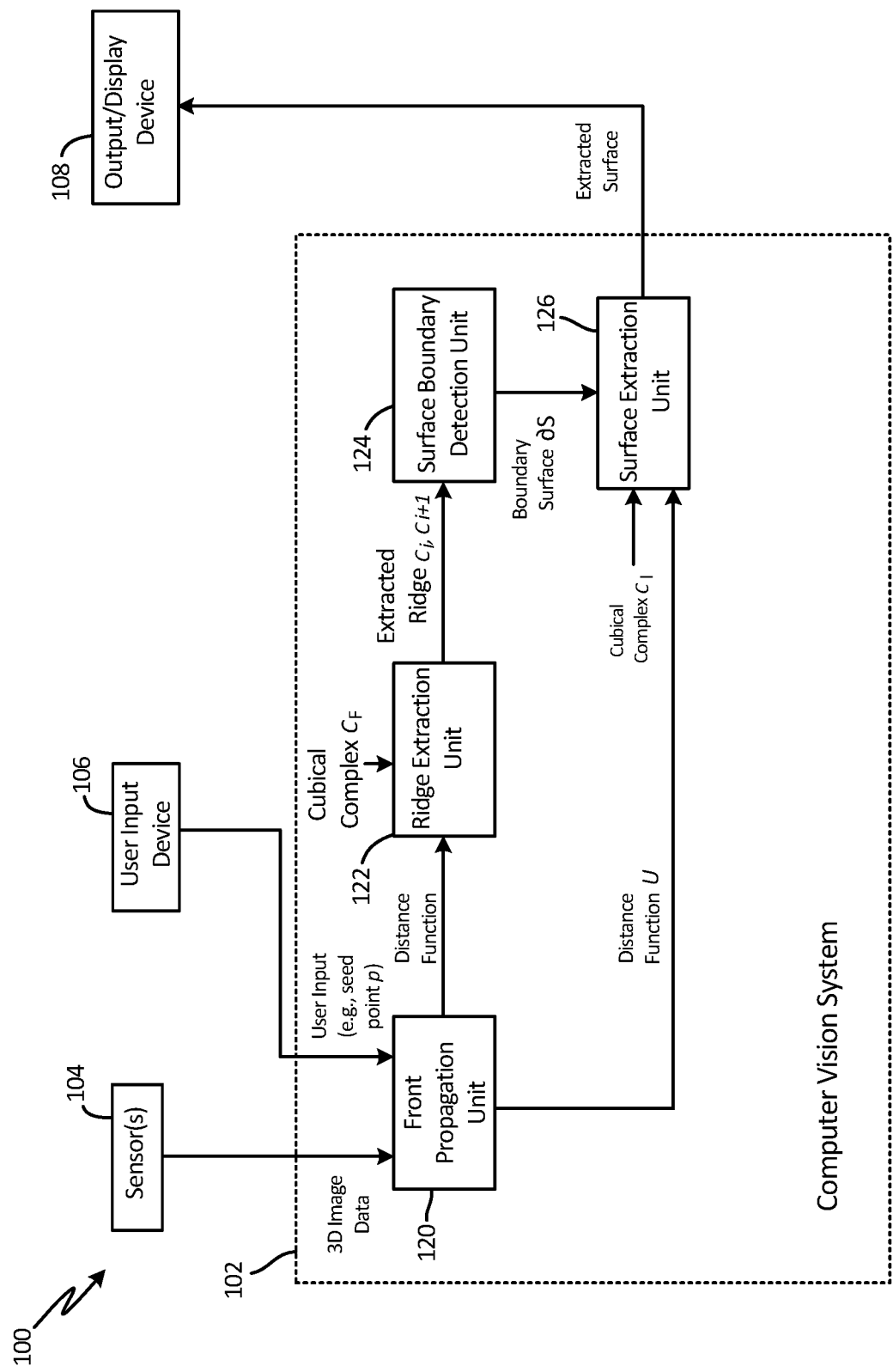
FIG. 1 is a system that includes a computer vision system for extracting a surface with unknown boundary from a three-dimensional image according to an embodiment of the present invention.

FIG. 1 is a block diagram of imaging system 100 according to an embodiment of the present invention. Imaging system 100 includes computer vision system 102, sensor system 104, user input device 106, and output device 108. Computer vision system includes one or more central processing units (CPUs) and memory devices (not specifically shown) for storing data and programs to be executed by the one or more processors. It should be understood that in some applications, computer vision system 102 may utilize other well-known computer components, such as graphical processing unit (GPUs) alone or in conjunction with the CPUs utilized. Memory device may be implemented as computer-readable non-transitory medium capable of storing instructions capable of being executed by the one or more processors, as well as data (i.e., 3D image data) received sensor system 104. In particular, the one or more processors included as part of computer vision system 102 executes instructions stored by the memory device implement one or more modules or units that perform operations on the received 3D image data. In the embodiment shown in FIG. 1, functional units include front propagation unit 120, ridge extraction unit 122, surface boundary detector unit 124, and surface extractor unit 126.

In the embodiment shown in FIG. 1, sensor system 104 collects three-dimensional image data and provides the collected image data to computer vision system 102 for analysis. Depending on the application, sensor system 104 may be comprised of one or more sensors capable of collecting three-dimensional image data. For example, sensor system 104 may include seismological sensors utilized to collect images of underground topologies. In other embodiments, sensor system 104 may include sensors for collecting three-dimensional medical imaging data (i.e., CAT scans, MRIs, etc.). In still other embodiments, various other types of three-dimensional image data is collected for subsequent analysis via computer vision system 12.

In the embodiment shown in FIG. 1, user input device 106 is connected to provide user input to computer vision system 102. User input device 106 may include one or more of a keyboard, mouse, touchscreen, or similar device utilized to provide an input to a computer system. As described in more detail below, in one embodiment of the present invention, the user provides a seed point p located on the surface to be extracted. The seed point is utilized as a starting point for calculating weighted distances in subsequent steps. However, in other embodiments the seed point p is automatically selected without requiring user input. In addition, output device 108 such as a display or monitor is utilized to display information collected by and/or generated by computer vision system 102. For example, the final product may be an extracted three-dimensional surface that is displayed or output to the user via output device 108.

In the embodiment described with respect to FIG. 1, the functional units implemented by computer vision system 102 include front propagation unit 120, ridge extraction unit 122, surface boundary detector unit 124, and surface extractor unit 126. The functional units operate on received 3D image data and a seed point p either provided by a user or generated automatically. The specific operations inputs provided to each functional unit, the operations performed, and the outputs generated are described with respect to the flowchart shown in FIG. 2, below.

Figure 2:
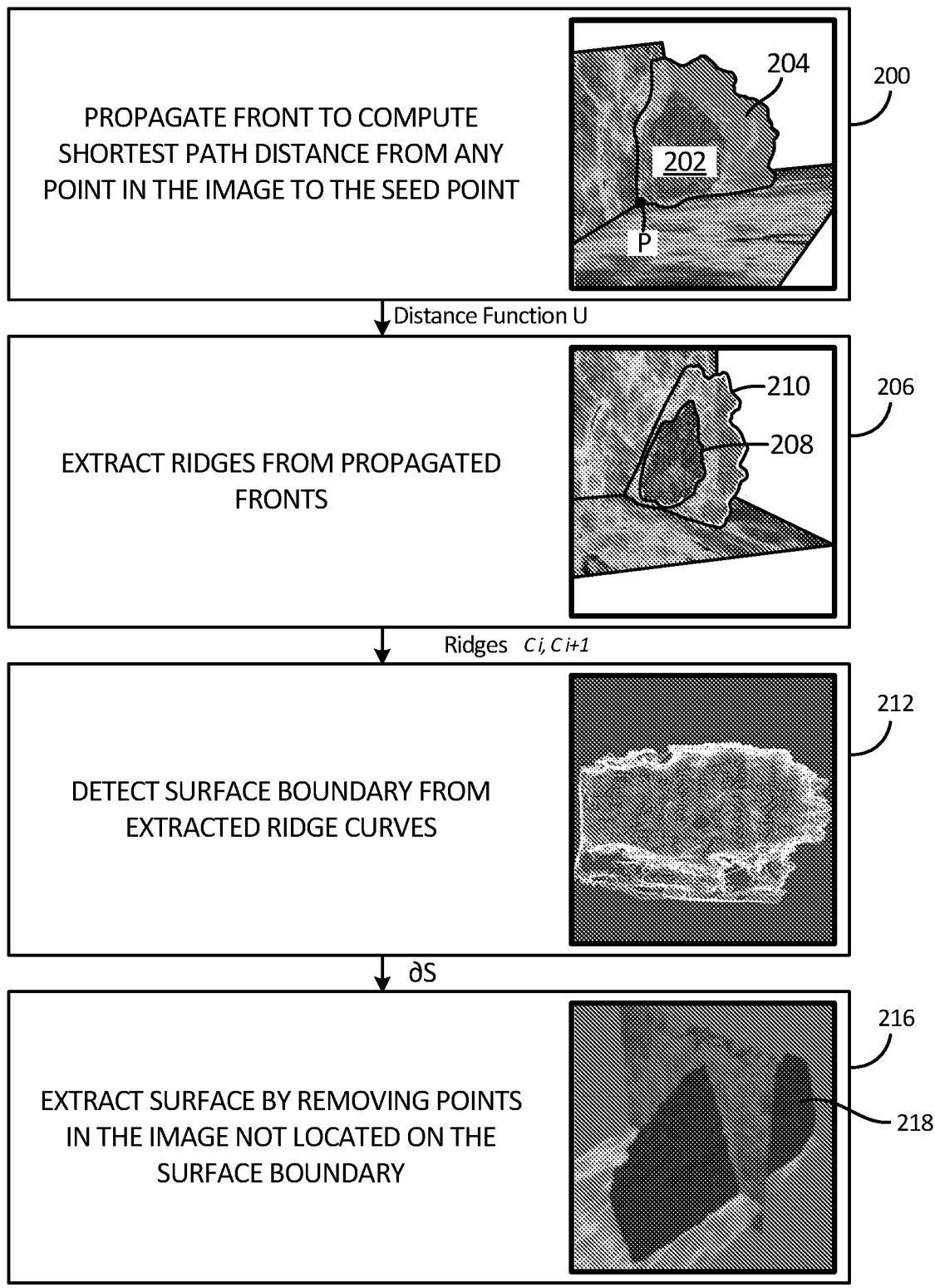
FIG. 2 is a flowchart illustrating steps implemented by the computer vision system to extract a surface with unknown boundary from a three-dimensional image according to an embodiment of the present invention.

FIG. 2 is a flowchart illustrating with accompanying drawings steps utilized in a computer vision system to extract a smooth surface according to an embodiment of the present invention. The method is described with reference to functional units illustrated in FIG. 1, above. The method receives as an input a three-dimensional (3D) image and a seed point provided by the user located on the surface to be extracted. In the embodiment shown in FIG. 2, the 3D image is a noisy local likelihood map.

At step 200, front propagation unit 120 (shown in FIG. 1) propagates a front from the identified seed point p. In one embodiment, front propagation unit 120 utilizes a fast marching algorithm to generate a collection of fronts that grow from a seed point and which are localized to a free-boundary surface of interest. The propagation of the front outward form the seed point results in the generation of a distance function U that describes the weighted distance from points along the front to the seed point p. The propagated front is a closed surface, referred to herein as a front to avoid confusion with the free-boundary surface to be extracted in subsequent steps. For example, in the image accompanying step 200, a cross-sectional view of the propagating front is shown at two instances in time. In particular, the front propagated at a first time is illustrated by shaded region 202, while the front propagated at a second time is illustrated by shaded region 204. The fronts are propagated from point p illustrated in the lower left corner of shaded region 202. In 2D space, the points along the front at a particular instant that have traveled the furthest as compared to nearby points tend to lie on the 2D curve of interest, illustrated in FIG. 3b. Generalized to 3D space, the points along the front that have traveled the furthest correspond to ridge points (i.e., the Euclidean path length from the seed point p to points on the front along minimal paths).

At step 206, ridge extraction unit 122 (also shown in FIG. 1) utilizes the distance function U generated by front propagation unit 120 in combination with a cubical complex $C_F$ to extract a plurality of ridge curves from the calculated front. A plurality of ridges may be extracted, and various criteria may be utilized to determine how many ridges to extract or when to stop extracting ridges. Extraction of first ridge 208 and second ridge 210 is illustrated visually as part of step 206. First ridge 208 is extracted based on the surface propagated at a first time as illustrated by shaded region 202. Second ridge 210 is extracted based on the surface propagated at a second time as illustrated by shaded region 204. In addition to the two ridges illustrated in the image associated with step 206, a plurality of additional ridges may be extracted from the front propagated at various points in time.

At step 212, surface boundary detector unit 124 utilizes the extracted ridges $c_i$, $c_{i+1}$, etc. calculated by ridge extractor unit 124 to detect surface boundaries within the 3D image. In one embodiment, surface boundary detector 124 determines at step 212 whether additional ridge curves should be extracted by ridge extractor unit 122. For example, in the image associated with step 212, a plurality of ridge curves extracted at step 206 are illustrated by white lines. The distance between adjacent ridge curves indicates how quickly the front is propagating through a particular region. At the boundary of the surface, the ridge curves become close together due to the speed function $\phi(x)$ becomes small outside of the surface. In one embodiment, surface boundary detector compares the distance between adjacent ridge curves and detects the presence of a surface when the distance becomes sufficiently small. The extracted surface boundary, denoted ∂S is provided as an output to surface extractor unit 126.

At step 216, surface extractor unit 126 receives as inputs the surface boundary ∂S detected by surface boundary detector 124, a cubical complex $C_I$, and the distance function U previously calculated by the front propagation unit 120, and in response to the received inputs seeks to extract the desired surface. For example, in one embodiment the surface is extracted via the ordered removal of free faces from the cubical complex $C_I$ based on the weighted path length U determined during execution of the Fast Marching algorithm to form the surface of interest, with the caveat that none of the cubical faces included on the surface boundary ∂S can be removed. As a result, fronts having a large distance U from the seed point are removed first, and the removal continues from both directions toward the surface ∂S to be extracted. The removal of faces on either side of the detected surface ∂creates a "wrapping" effect around the surface to be extracted. In one embodiment, a constraint is imposed that prevents faces from being removed that are located on the boundary curve or joining to the boundary curve. Thus, when the face removal process reaches a point when no more faces are free (i.e., removal of the face would result in a hole being created in the surface), the process ends, and the remaining faces define the extracted surface. The image associated with step 216 illustrates the extraction of surface 218 (illustrated by shaded region), which represents the desired output of computer vision system 102 (shown in FIG. 1). For example, in seismology applications the extracted surface may represent fault surfaces in seismic images. In medical applications, the extracted surface may represent the surface of a patient's heart (e.g., ventricles).

Figure 3B:
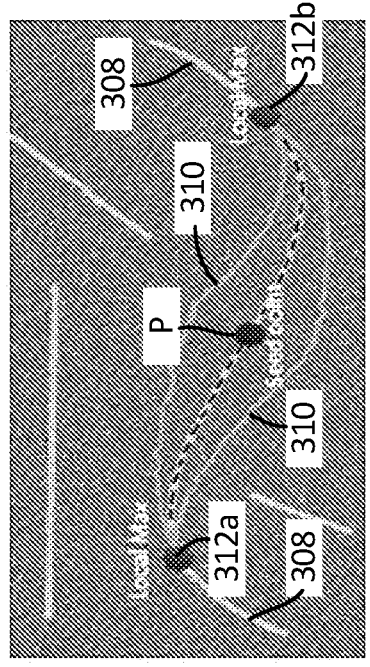
FIG. 3b is a 2D diagram illustrating a simple example of front propagation according to an embodiment of the present invention.
Figure 3C:
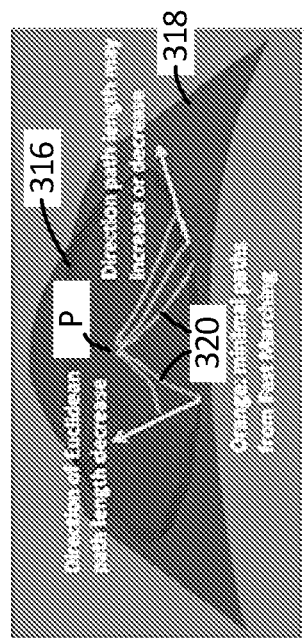
FIG. 3c is a diagram illustrating propagation of the front with respect to the surface according to an embodiment of the present invention.
Figure 3A:
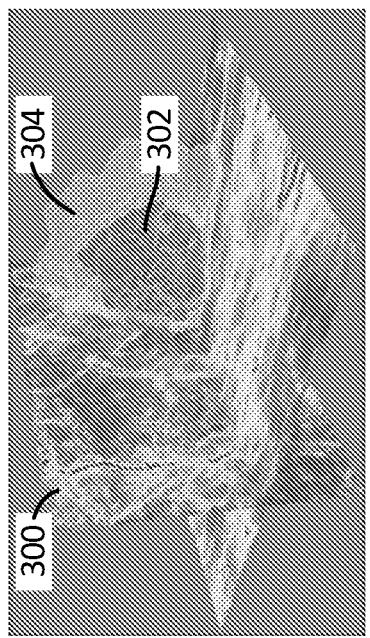
FIG. 3a is a 3D image illustrating propagation of a front in 3D space at two instances of time according to an embodiment of the present invention.
Figure 4:
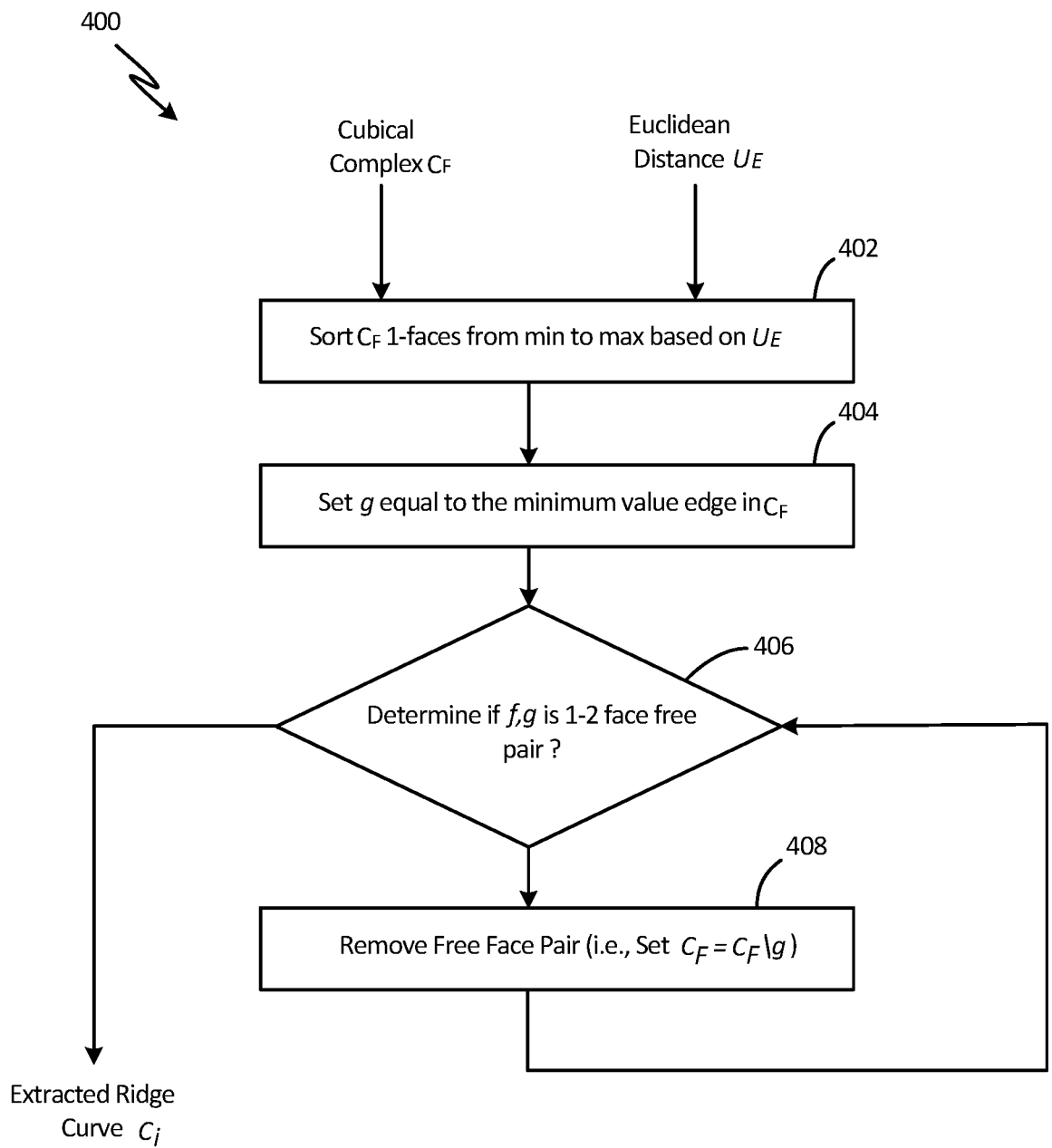
FIG. 4 is a flowchart illustrating steps employed to extract one or more ridges based on the Euclidean distance calculated by the propagated front according to an embodiment of the present invention.
Figure 5A:
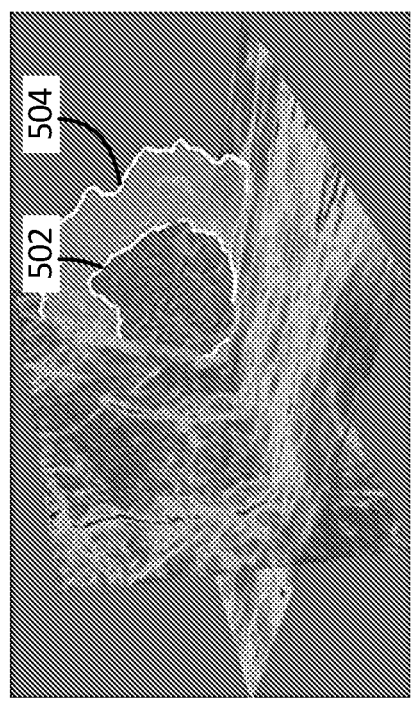
FIG. 5a is an image illustrating ridge curve extraction via retraction of the front according to an embodiment of the present invention.
Figure 5B:
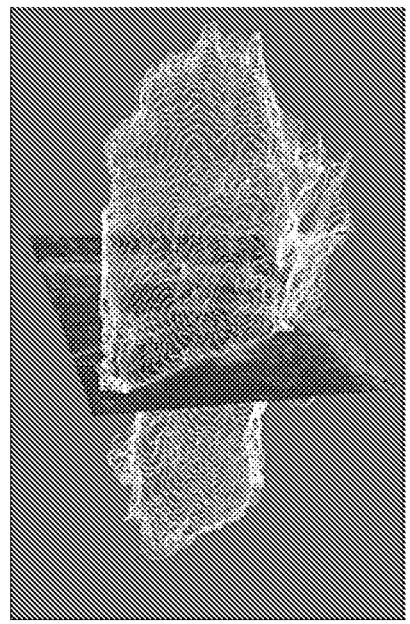
FIG. 5b is an image illustrating detection of a surface boundary according to an embodiment of the present invention.
Figure 6:
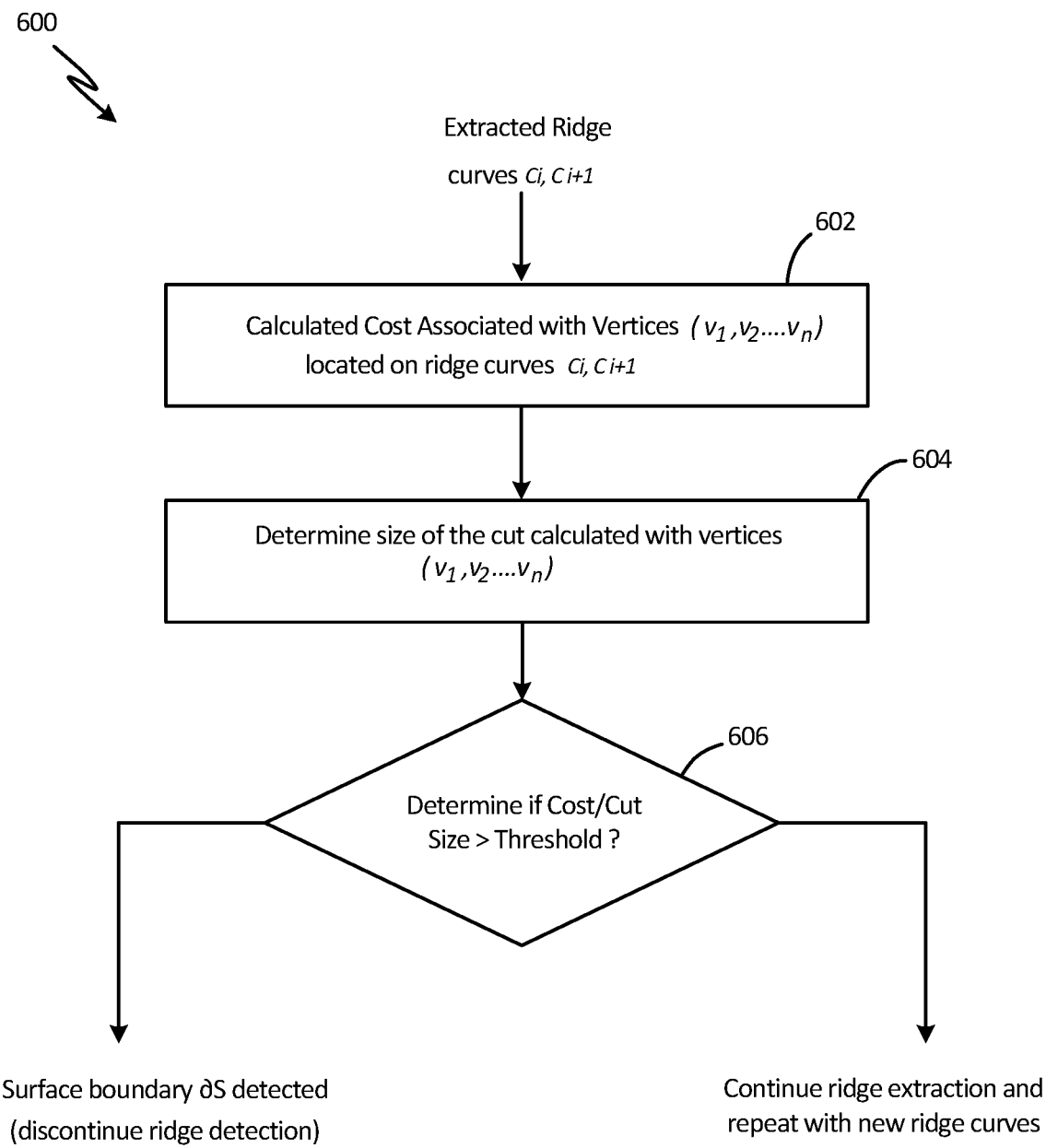
FIG. 6 is a flowchart illustrating steps employed to detect the surface boundary based on a comparison of previously extracted ridges according to an embodiment of the present invention.
Figure 7:
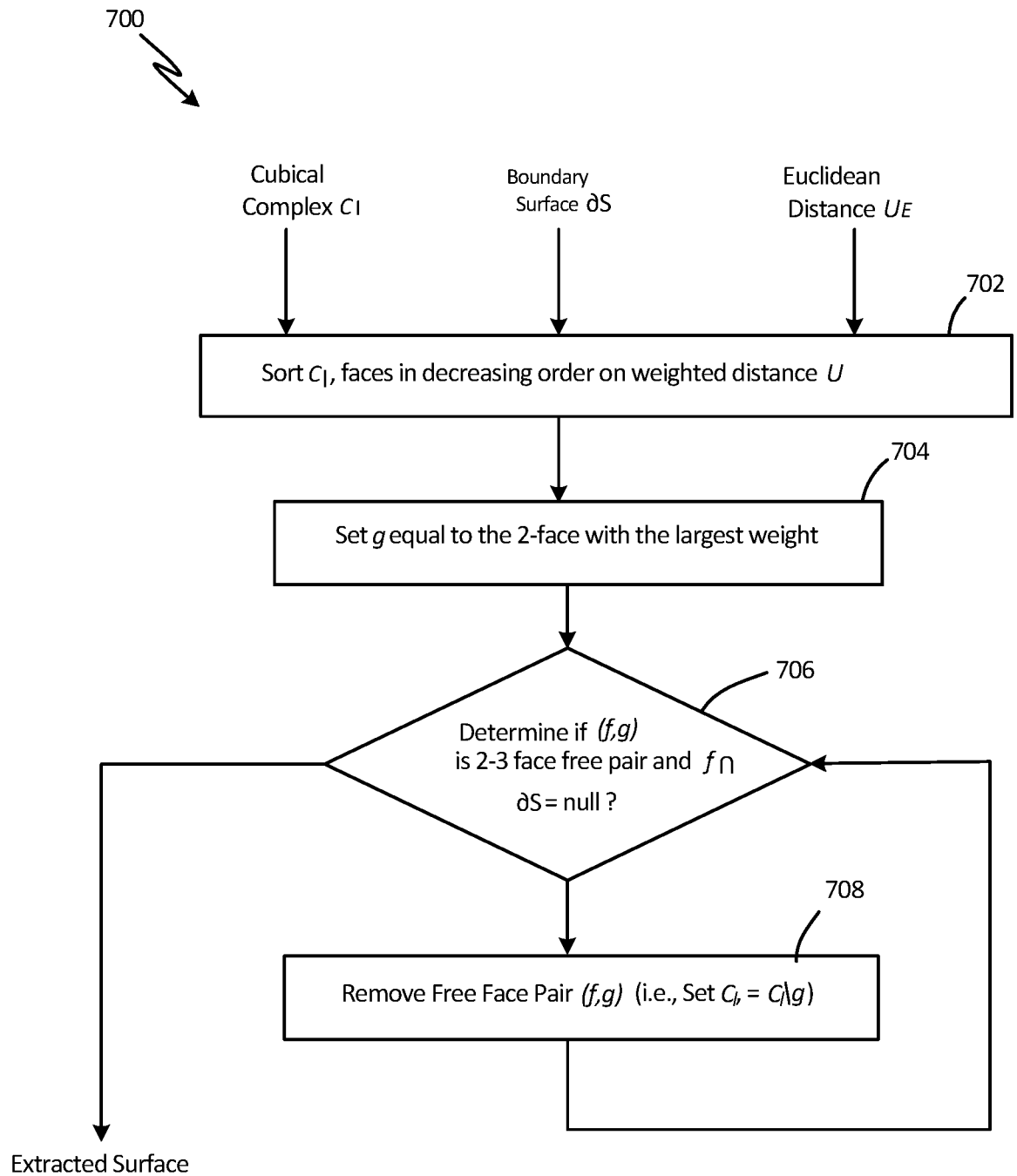
FIG. 7 is a flowchart illustrating steps employed to extract the desired surface based on the surface boundary according to an embodiment of the present invention.

FIGS. 3-7 describe and illustrate in more detail each of the steps enumerated with respect to FIG. 2. In particular, FIGS. 3a-3c illustrate front propagation according to an embodiment of the present invention (step 200). FIG. 4 illustrates in more detail the ridge extraction process according to an embodiment of the present invention (step 206). FIGS. 5a and 5b are graphical illustrations of the ridge extraction and surface boundary steps according to an embodiment of the present invention. FIG. 6 illustrates in more detail detection of the surface according to an embodiment of the present invention (step 212). Finally, FIG. 7 illustrates in more extraction of the surface according to an embodiment of the present invention (step 216).

For example, FIG. 3a is a 3D image 300 (shown with cross-sectional elements) that illustrates propagation of a front in 3D space at two instances of time according to an embodiment of the present invention. As discussed with respect to step 200 (shown in FIG. 2), the front is propagated from a user-specified seed point p. In particular, the front propagated at a first time is illustrated by shaded region 302, while the front propagated at a second time is illustrated by shaded region 304.

The embodiment shown in FIG. 3a-3c utilizes a variant of the Fast Marching algorithm that allows a front to be propagated from a single seed point p. In particular, the 3D image 300 is described as a 3D image grid comprised of a plurality of pixels x. Each pixel x in the given image grid is defined by a function $\phi(x)$, denoted by $\phi: \mathbb{Z}_n^3 \rightarrow \mathbb{R}^+$, wherein $\mathbb{Z}_n = \{0, 1, \ldots, n-1\}$, a noisy function defined on each pixel of the given image grid. The function $\phi(x)$ has the property that (in the noiseless situation) a large value of $\phi(x)$ indicates a high likelihood of the pixel x belonging to a surface of interest. In the embodiment described herein, the variant of the Fast Marching algorithm solves a discrete approximation to eikonal equation, provided below:

$$\begin{cases} |\nabla U(x)| = \phi(x) \; x \in \mathbb{Z}_n^3 \setminus \{p\} \\ U(p) = 0 \end{cases} \quad \text{Equation 1}$$

wherein $\nabla$ denotes the spatial gradient, x lies in the set $\mathbb{Z}_n^3$, and $|\cdot|$ is the Euclidean norm, and $p \in \mathbb{Z}_n^3$ denotes an initial seed point, which in this embodiment lies somewhere on the surface of interest. The function U at a pixel x is the weighted minimum path length along any path from x top, with weight defined by $1/\phi$. The propagated front evolving from the seed point p at each time instant is equidistant in terms of U (although not necessarily equidistant in terms of Euclidean distance traveled) to the seed point and is iteratively approximated. The front moves in an outward normal direction with speed proportional to $\phi(x)$, and therefore propagates more quickly when $\phi$ is large (i.e., along the surface of interest) and more slowly when $\phi$ is small (i.e., farther away from the surface). This leads to the conclusion that points x along the front at a particular time instant that have traveled the furthest from seed point p as compared with nearby points tend to lie on the surface of interest. The propagation of the front is more readily apparent in the simplified 2D example illustrated with respect to FIG. 3b.

As shown in 2D image 306, a seed point p is located along a curve 308 to be extracted from the 2D image. Analogized to the 3D embodiment, curve 308 represents the surface to be extracted from a 3D image. A front 310 is propagated outwardly from seed point p at a speed at each pixel proportional to $\phi(x)$. As discussed above, the front 310 propagates more quickly when $\phi(x)$ is large, which is the case along the surface of interest (in this example, curve 308). As a result, front 310 is elongated along the curve 308 to be extracted, with the largest distance traveled by front 310 indicated by local max 312a and 312b. As illustrated in FIG. 3b, the propagated front is a closed-spaced curve. Analogizing the 2D case to the 3D case, the propagating front creates ridge points that are located along the surface of interest. More particularly, a one-dimensional ridge point of a function is defined such that all eigenvectors of the Hessian (except one) are negative and the derivative of the function in the direction of eigenvectors corresponding to negative eigenvalues are zero, which intuitively means a local maximum in one direction.

FIG. 3c is a diagram illustrating propagation of the front with respect to the surface. In particular, in the 3D image 314 shown in FIG. 3c, a front 316 is propagated outwardly from seed point p. In particular, the front 316 propagates along surface 318 due to the higher value of the function $\phi(x)$ along surface 318, and as a result the front elongates along surface 318. Weighted minimum path distances from the seed point p to the front are illustrated by the plurality of lines (labeled "320"), wherein the weighted minimum path U(x) is inversely proportional to the function $\phi(x)$. The Euclidean distance from the seed point p to a point on the propagated front 316 is maximized at the intersection of front 316 and surface 318 (that is, the Euclidean path length from the seed point to points on the front along minimal paths, likely like on the surface of interest). More precisely, the propagated front is defined by the following equation:

$$F = \{x \in \mathbb{Z}_n^3 : U(x) \in [D, D+\varepsilon)\} \quad \text{Equation 2}$$

wherein F represents the front and wherein $\varepsilon > 0$ is small. Furthermore, define $d_E : F \rightarrow \mathbb{R}^+$ such that $d_E(x)$ is the Euclidean path length of the minimal weighted path (with respect to the distance U) from x to seed point p. As discussed above, the minimum weighted path defined by $d_E$ tend to lie on the surface of interest (i.e., on the ridge points). The minimum weighted path defined by $d_E$ is monitored by tracking the distance $U_E$ that solves the eikonal equation with the right hand side of Equation 1 equal to "1", simultaneously in the solution for U.

The likelihood of ridge points lying on the surface is visualized in the embodiment shown in FIG. 3c. As discussed above, the Euclidean distance from the seed point p to a point on the propagated front 316 is maximized at the intersection of front 316 and surface 318. At points located in a direction orthogonal to the surface (at the point of intersection between the surface and the front), the minimal paths have Euclidean lengths that decrease as $\phi$ decreases in this direction, thus front propagates more slowly in this region and therefore result in smaller Euclidean path lengths. For points located along the surface, at the points of intersection between the surface and the front, the path length may increase or decrease as compared with adjacent points, depending on the uniformity of ϕ on the surface. This characteristic implies the presence of ridges in the image, wherein in the direction orthogonal to the surface, the minimal paths have Euclidean lengths that decrease since ϕ becomes small in this direction, thus minimal paths travel slower in this region (and thus have smaller Euclidean path lengths). The decrease in the Euclidean distance at locations orthogonal to the intersection between front 316 and surface 318 indicates that ridge points/curves will develop at the intersection of the propagated front 316 and the surface of interest 318.

Stated more simply, points along the front at a particular instant in time that have traveled the furthest (with respect to Euclidean path length), as compared with nearby points, tend to lie on the surface of interest. This is because points traveling along locations where ϕ is high (i.e., on the surface of interest) travel the fastest, tracing out paths have large arc-lengths. Having detected the ridges as shown with respect to FIGS. 3a-3c, the ridges are extracted as shown in FIGS. 4a-4b.

In the embodiment shown in FIG. 4, and illustrated graphically in FIG. 5a, detected ridges are extracted by retracting the front to the ridge curve via the ordered removal of free faces. These embodiments rely, in part, on cubical complexes theory, which defines topological notions (and computational methods) for discrete data analogous to topological notions in the continuum. In particular, cubical complexes theory ensures guarantees the extraction of lower dimensional structures (e.g., curves from surfaces, and surfaces from volumes) as desired in this application. In general, the term "cubical complex" refers to an object that consists of basic elements referred to as "faces", of d-dimensions (e.g., points (0-faces), edges (1-face), squares (2-faces) and cubes (3-faces)). More particularly, a "d-face" is the cartesian product of d intervals of the form (a, a+1) where a is an integer. A d-dimensional cubical complex can therefore be defined as a finite collection of faces of d dimensions and lower such that every sub-face of a face in the collection is contained in the collection. Ridge extraction (discussed with respect to step 206) and surface extraction (discussed with respect to step 216) relies on simplifying cubical complexes by an operation that is analogous to the continuous topological operation called a deformation retraction (i.e., the operation of continuously shrinking a topological space to a subset). For example, a punctured disk can be continuously shrunk to its boundary. Therefore, the boundary circle is a deformation retraction of the punctured disk, and the two are said to be homotopy equivalent. In an analogous discrete operation, faces of the cubical complex can be removed while preserving homotopy equivalence. Free faces, defined in a cubical complex theory, are removed thereby simplifying the cubical complex, while preserving a discrete notion of homotopy equivalence. The following definition can be applied: Let X be a cubical complex, and let f, g ⊂ X be faces, wherein g is a proper face of f if g≠f and g is a sub-face of f. A face g is free for X, and the pair (f, g) is a free pair for X if f is the only face of X such that g is a proper face of f. This definition directly provides a constant-time operation to check whether a face is free. For example, if a cubical complex X is a subset of the complex formed from a 3D image grid, a 2-face is known to be free by checking whether only one of the two 3-faces containing the 2-face is contained in X.

Having propagated the front as described with respect to step 200 (shown in FIG. 2, and shown in FIGS. 3a-3c), cubical complexes are constructed and the front is retracted by removing free faces to obtain an lower dimensional curve that lies on the free-boundary surface to be obtained as described at step 206 (shown in FIG. 2, and described in more detail with respect to FIGS. 4 and 5a-5b). Similarly, cubical complexes can be utilized to retract a volume to obtain a surface as described at step 216.

FIG. 4 is a flowchart that illustrates steps by the computer vision system to extract the detected ridge curves according to an embodiment of the present invention. Inputs to the method include cubical complex $C_F$ constructed and the Euclidean distance $U_E$. For ridge extraction, the two dimensional cubical complex $C_F'$ of the front at a time instant is constructed based on the following rules. First, the two-dimensional cubical complex $C_F'$ contains all two-faces f in $\mathbb{Z}_n^3$ such that the three-faces g1, g2 that contain f are such that one of g1, g2 has all zero-sub faces with U<D and one does not. Second, each face f of $C_F'$ has cost equal to the average of $U_E$ over zero-sub faces off. Third, cubical complex $C_F$ removes from $C_F'$ the two faces with smallest local minima of cost. The last operation punctures the front at two locations (on both sides of the front) so that it can be retracted to the ridge curve. The ridge curve can now be computed by removing free (1,2)-face pairs until no free faces are left.

At step 402, the $C_F$ 1-faces are sorted from minimum to maximum based on the calculated Euclidean distance $U_E$. At step 404, g is set equal to the minimum value edge in $C_F$. At step 406, a determination is made whether (f, g) is a 1-2 face free pair. If (f, g) is a 1-2 face free pair, then the cubical complex is thinned by removing the 1-2 face pair at step 408 (i.e., set $C_F=C_F\backslash g$, such that g is no longer included in the cubical complex $C_F$). The process repeats at step 406 until no additional 1-2 face free pairs remain (i.e., the cubical complex has been sufficiently thinned or retracted to the detected ridge). In one embodiment, the specific algorithm employed is described as follows:

---

Ridge Curve Extraction
1:   Input: 2D cubical complex $C_F$ of FM front and Euclidean distance $U_E$
2:   Sort $C_F$ 1-faces from min to max based on $U_E$
3:   repeat
4:       Let g be the minimum value edge in $C_F$
5:       if (f, g) is 1-2 face free par, then $C_F = C_F \setminus g$
6:   until no free pairs in $C_F$

---

The illustrations provided with respect to FIGS. 5a and 5b illustrate graphically the extraction of ridge curves according to the method described with respect to FIG. 4. The embodiment shown in FIG. 5a illustrates ridge curve extraction by retracting the Fast Marching front at two instances in time. At the first instant in time, ridge curve 502 is extracted using the ridge curve extraction algorithm according to an embodiment of the present invention. At the second instant in time, ridge curve 504 is extracted using the ridge curve extraction algorithm. This procedure of retracting the Fast Marching front is continued for different fronts of the form {U<D} with D increasing. As a result, many ridge curves are extracted on the surface of interest (as shown in FIG. 5b, in which a plurality of ridge curves, illustrates by white lines, have been extracted). Although the number of ridge curves extracted may vary from application to application, in one embodiment D is selected with increments of ΔD=20, until a stopping condition is achieved. This may result in a few ridge curves being extracted up to many, many more. In experiments, approximately 10-20 ridge curves were extracted before reaching the stopping condition.

FIG. 6 is a flowchart that illustrates steps utilized by the computer vision system to determine when to stop the process of extracting ridge curves as discussed with respect to FIG. 4, and thereby define the outer boundary of the surface of interest (as discussed with respect to step 212 in FIG. 2) according to an embodiment of the present invention. In the embodiment shown in FIG. 6, a stopping criteria is utilized to determine when a sufficient number of ridge curves have been extracted such that surface boundaries can be properly detected at the next step. In this embodiment, the observation that the Euclidean distance between adjacently located ridge curves decreases at the boundary of the surface. This is due to the fact that the speed function ϕ becomes small outside of the surface. Detecting locations where the distance between points on adjacent ridge curves $c_i$ becomes small allows for the detection of the outer. In one embodiment, this is formulated as a graph cut problem, in which graph G is defined as follows.

- Vertices V are 0-faces in all the 1-face complexes $c_i$ formed from ridge extraction
- Edges E are $(v_1, v_2)$ where $v_1, v_2 \in V$ are such that $v_1, v_2$ are connected by a 1-face in some $c_i$ or $v_1$ is a 0-face in $c_i$ and $v_2$ is the closest (in terms of Euclidean distance) 0-face in $c_{i+1}$ to $v_1$
- A cost $c_{jk}=|v_j-v_k|$ is assigned to each edge $(v_j, v_k)$ where $v_j$ and $v_k$ belong to different $c_i$
- For edge $(v_j, v_k)$ such that $v_j$ and $v_k$ belong to the same $c_i$, the cost is the average of edge costs of edges with vertex $v_j$ or $v_k$ and such that the edges joins vertices on different $c_i$
- Source is defined as seed point p, and the sink to be the last ridge curve $c_l$ The goal is to obtain a cut of G (i.e., to separate G into two disjoint sets) with the minimum total cost defined as the sum of all costs along the cut. In this way, inputs received into the stopping criteria algorithm include extracted ridge curves (e.g., ridge curves $c_i$, $c_{i+1}$). At step 602 a cost is calculated associated with vertices V (e.g., $v_1$, $v_2$) located on the extracted ridge curves $c_i$, $c_{i+1}$, wherein the vertices defined edges E as described above. A cost is assigned to each edge as described above, and based on the cost associated with each edge, a total cost can be calculated. At step 604, the size of the cut is calculated, wherein the size is approximately equal to the perimeter of the cut. At step 606, the calculated cost divided by the cut size is compared to a stop threshold. If the cost/cut is less than the stop threshold, then ridge extraction continues as described with respect to FIG. 4 and subsequently extracted ridge curves are provided as input to the stop algorithm and the method is repeated. If the cost/cut is greater than the stop threshold, then the ridge extraction process is stopped, and the cut is selected as the surface boundary of the surface of interest. Thus, in general the stop algorithm disclosed with respect to FIG. 6 selects a surface boundary when the distance between the ridge curves is sufficiently small (i.e., presents the smallest minimum total cost).

Figure 8:
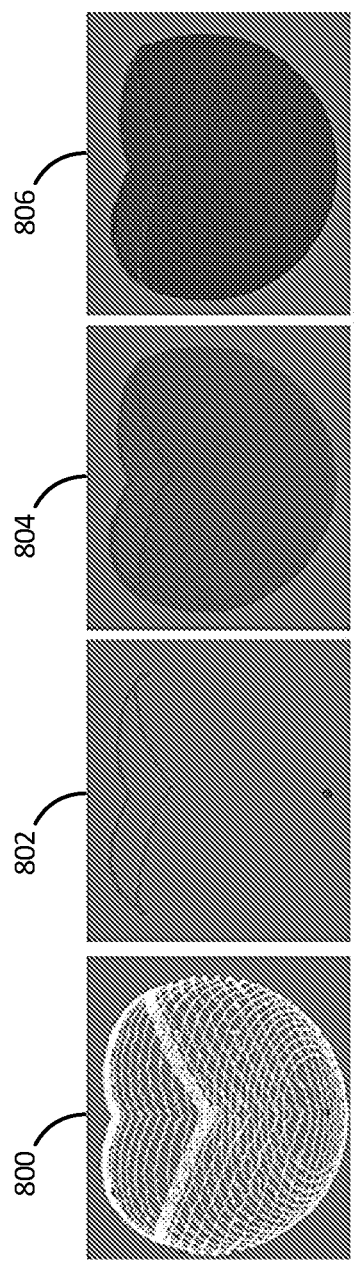
FIG. 8 includes a plurality of images that illustrate surface extraction based on a surface boundary according to an embodiment of the present invention.

FIG. 7 is a flowchart that illustrates steps by the computer vision system to extract the surface according to an embodiment of the present invention. Inputs to the method include the 3D cubical complex of the image $C_I$, the surface boundary ∂S selected as described with respect to FIG. 6, and the weighted distance U to seed point p. At step 702, the faces of the cubical complex $C_I$ are sorted in decreasing order (i.e., from maximum to minimum based on the weighted distance U to the seed point p. At step 704, g is set equal to the 2-face with the largest weight. At step 706, a determination is made whether (f, g) is a 2-3 face free pair and whether the face intersects or is included as part of the surface boundary ∂S. If (f, g) is a 2-3 face free pair and is not located on the boundary surface ∂S, then at step 708 the cubical complex is thinned by removing the 2-3 face pair at step 708 (i.e., set $C_F=C_F \setminus g$, such that g is no longer included in the cubical complex $C_F$). The process repeats at step 706 until no additional 2-3 face free pairs remain (i.e., the cubical complex has been sufficiently thinned or retracted to the detected ridge). As the removal of faces progresses, faces are removed on either side of the surface boundary, creating a "wrapping" effect around the surface of interest. Near the end of the removal process, points on the surface cannot be removed without creating a hole, so no faces are free. At this point, the algorithm is stopped and the process ends. In one embodiment, the specific algorithm employed is described as follows:

Surface Extraction from Boundary of Surface
1: Input: $C_I$ - 3D cubical complex of image
2: Input: ∂S - boundary of surface (1D cubical complex)
3: Input: U - weighted distance to seed point p
4: Sort faces of $C_I$ based on U in decreasing order
5: repeat
6:   Let g be the 2-face with the largest weight
7:   if (f, g) is a 2-3 face free pair and f ∩ ∂S = ∅, then $C_I = C_I \setminus g$
6: until no free faces in $C_I$ without intersection to ∂S FIG. 8 includes a plurality of images that illustrate surface extraction based on a surface boundary according to an embodiment of the present invention. In particular, the images illustrate various steps in the process of extracting a 3D surface based on a noisy image of a sphere with a top cut. Image 800 illustrates the extraction of ridge curves via the method described with respect to FIG. 4 (i.e., ridge curve extraction). In particular, notice the clustering of extracted ridge curves along the top cut of the sphere (i.e., relatively small distance between adjacent ridge curves) indicating a surface boundary. Image 802 illustrates detection of the surface boundary corresponding with the top cut via the method described with respect to FIG. 6. Image 804 illustrates the final surface extracted via the method described with respect to FIG. 7 (i.e., surface extraction from boundary of surface). Image 806 illustrates the actual or ground truth shape of the object imaged and extracted as shown in images 800, 802 and 804. As illustrated, the surface extracted as shown in image 804 closely resembles the ground truth of the object as shown in image 806.

Figure 9:
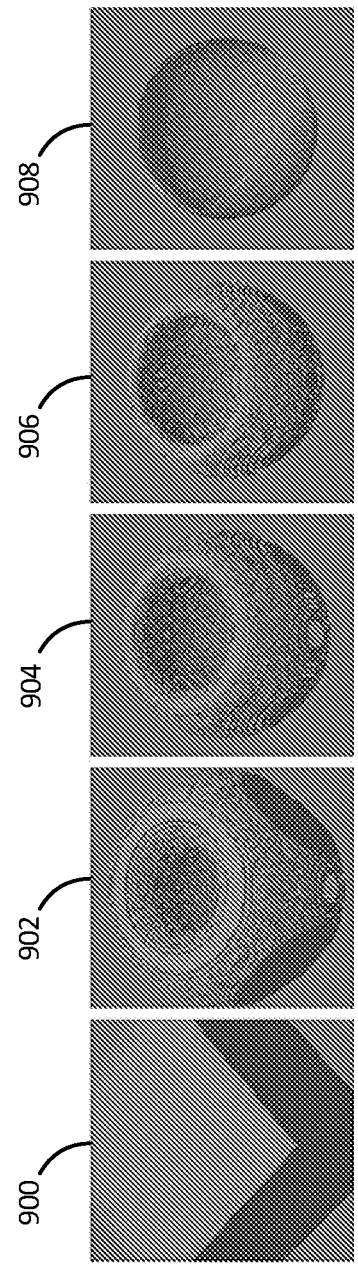
FIG. 9 includes a plurality of images that illustrate the removal of free faces (according to the method described with respect to FIG. 7) to obtain the desired surface of interest.

FIG. 9 includes a plurality of images that illustrate the removal of free faces (according to the method described with respect to FIG. 7) to obtain the desired surface of interest. In particular, image 900 illustrates the 3D cubical complex with no free faces yet removed. Thus, the image appears as a cube. In each successive image (902, 904, 906, and 908, additional free face pairs are removed, further refining the shape of the desired surface of interest until no free face pairs remain, resulting in the extracted surface illustrated in image 908.

Figure 10B:
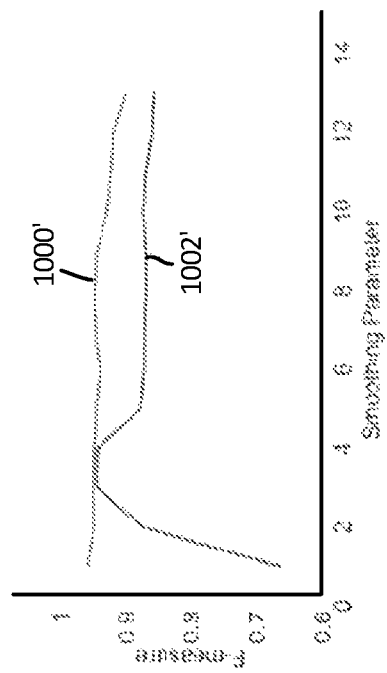
FIGS. 10a-10b are plots that illustrate the quantitative analysis of smoothing degradations of an embodiment of the present invention as compared to a prior art tool.
Figure 10A:
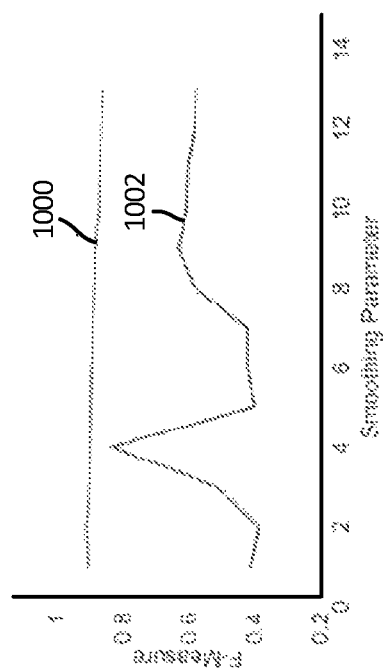

FIGS. 10a and 10b are graphs illustrating quantitative analysis of the surface extraction method according to an embodiment of the present invention as compared with a prior art surface extraction method. In particular, FIG. 10a illustrates a quantitative analysis of the measured boundary, while FIG. 10b illustrates a quantitative analysis of the measured surface. The y-axis of each graph is the F-measure, which is a measure of how closely the surface returned by the respective algorithms match the ground truth (i.e., actual) surface. The F-measure provides a single quantity summarizing both precision and recall. All quantities are between 0 and 1, wherein a value of 1 indicates a more accurate returned surface. The x-axis of each graph is a smoothing parameter, which are fine-tuned or set to achieve the desired segmentation. In the embodiments shown in FIGS. 10a and 10b, the smoothing parameter is varied from $\sigma$=0, 1, 2, 3, . . . , 14. The surface extraction method of the present invention is labeled 1000 in FIG. 10a and 1000' in FIG. 10b. The prior art method of surface extraction is labeled 1002 in FIG. 10a and 1002' in FIG. 10b, and represents the method described by the prior art reference: "Crease surfaces: From theory to extraction and application to diffusion tensor MRI." Visualization and Computer Graphics, IEEE Transactions on 16(1) (2010) 109-119 ('hereinafter the Crease method").

The comparison shown in FIG. 10a illustrates that the surface extraction method of the present invention (line 1000) provides a higher F-measure despite the selected smoothing parameter than the Crease method. In addition, the surface extraction method (line 1000) provides a relatively constant F-measure at all values of the smoothing parameter selected, degrading only slightly with increased smoothing parameter values.

The comparison shown in FIG. 10b similarly illustrates that the surface extraction method of the present invention (line 1000') is superior to the Crease method (line 1002'), with the F-measure associated with the surface extraction method of the present invention (1000') providing an F-measure that is equal to or greater than that provided by the Crease method at every smoothing parameter selected. Once again, the F-measure remained relatively constant with respect to the present invention, with the F-measure degrading only slightly at higher smoothing parameter values.

Figure 11B:
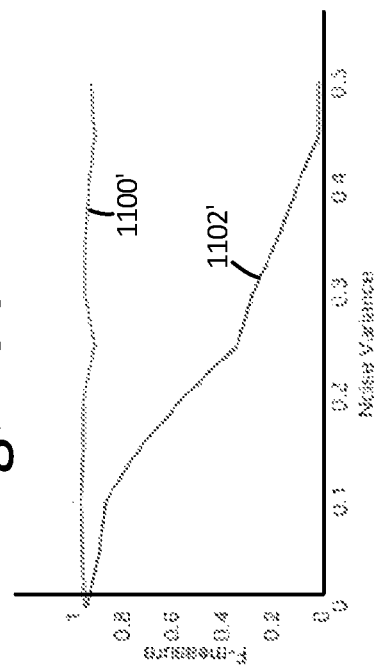
FIGS. 11a-11b are plots that illustrate the quantitative analysis of noise degradations of an embodiment of the present invention as compared to a prior art tool.
Figure 11A:
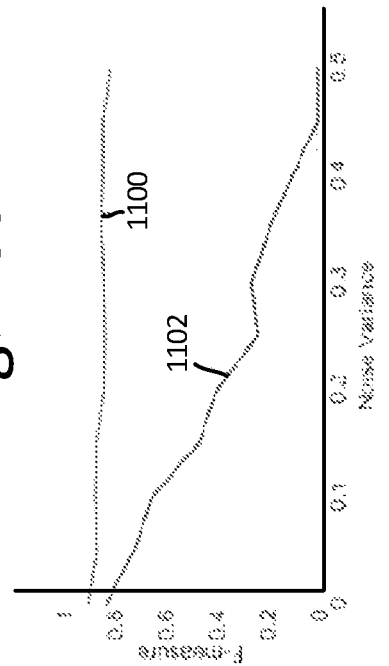

FIGS. 11a and 11b are graphs illustrating quantitative analysis of the surface extraction method according to an embodiment of the present invention as compared with a prior art surface extraction method (i.e., the Crease method, described with respect to FIGS. 10a and 10b) with respect to varying levels of noise. Once again, FIG. 11a illustrates a quantitative analysis of the measured boundary, while FIG. 11b illustrates a quantitative analysis of the measured surface. The y-axis of each graph is the F-measure, which is a measure of how closely the surface returned by the respective algorithms match the ground truth (i.e., actual) surface. The F-measure provides a single quantity summarizing both precision and recall. All quantities are between 0 and 1, wherein a value of 1 indicates a more accurate returned surface. The x-axis of each graph illustrates varying levels of noise distortion introduced into the analyzed image (in this case, seismic images in which the signal-to-noise ratio (SNR) is typically low). The smoothing parameter in this embodiment has been assigned to the one that demonstrated the highest F-measure in the experiment shown in FIGS. 10a and 10b.

FIGS. 11a and 11b both illustrate the improved performance of the surface extraction method of the present invention as compared with the Crease method. In particular, as the noise variance increases, the F-measure associated with the Crease method degrades rapidly to zero (as illustrated by lines 1102 and 1102'). In contrast, the F-measure associated with the surface extraction method of the present invention (illustrated by lines 1100 and 1100') maintains a relatively high F-measure despite the increased noise variance. In this way, the surface extraction method of the present invention provides excellent surface extraction even in the presence of significant noise.

Figure 12B:
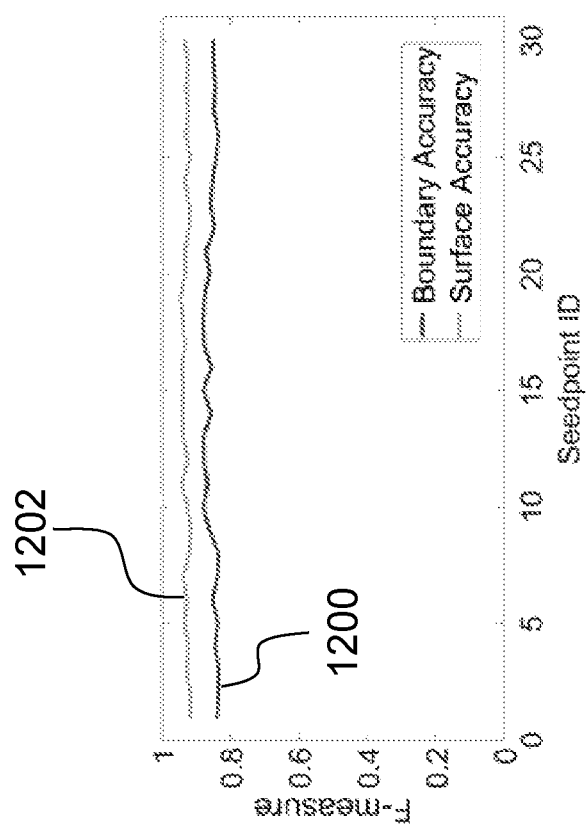
FIG. 12b is a plot illustrating quantitative analysis for various seed points utilized as an input.
Figure 12A:
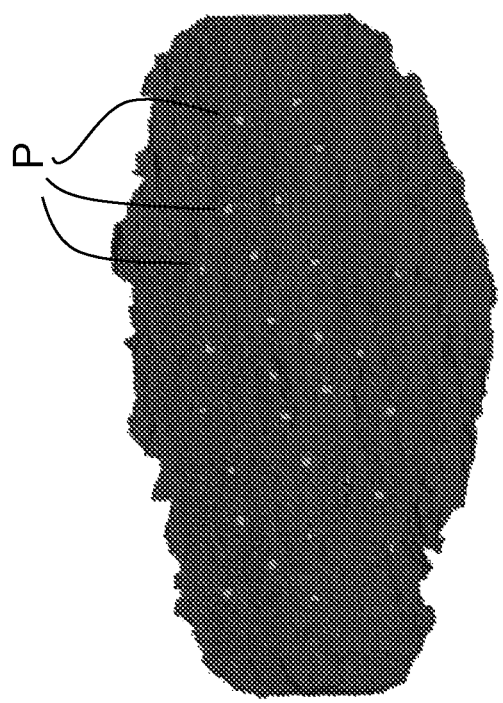
FIG. 12a is a visualization illustrating seed points that could be selected as an input according to an embodiment of the present invention.

FIGS. 12a and 12b illustrates the performance of the surface extraction method according to an embodiment of the present invention utilizing randomly located seed points p. FIG. 12a illustrates the location of the selected seed points p, randomly distributed at various locations along the surface to be extracted. FIG. 12b illustrates the results of the surface extraction method utilizing each of the plurality of points shown in FIG. 12a. Once again, the y-axis represents the F-measure, while the x-axis represents identification (ID) of the plurality of different seed points p, each located at a different location along the surface of interest. In this embodiment, thirty different seed points were selected, randomly sampled from the ground truth surface. Line 1200 represents the boundary accuracy while line 1202 represents the surface accuracy. As illustrated in the embodiment shown in FIG. 12, the F-measure does not vary despite the plurality of different locations of seed point p. That is, the same boundary and surface accuracy is maintained no matter the location of the seed point p.

In addition, in another embodiment of the present invention, the selection of the seed point p may be automated. In this embodiment, local differential operator (based on a smoothed Hessian matrix) is used to compute the likelihood of a pixel belonging to the desired surface. By finding the extremas of the Hessian and running a piece-wise planar segmentation of these points using a Random Sample Consensus (RANSAC) successively; the point on each of the segments located closest to other points on the segment are seed points. This method operates on the assumption that the surfaces are roughly planar (if this assumption is incorrect, there could possibly be redundant seed points on the same surface, which would result in repetitions in surfaces in the final output, which could be filtered). Having identified the seed points p, the surface extraction algorithm described with respect to FIG. 2 is executed to propagate the front from the seed point p, extract ridge curves from the propagated front, detect surface boundaries from the extracted ridge curves, and extract surfaces based on the removal of free face pairs.

Figure 13B:
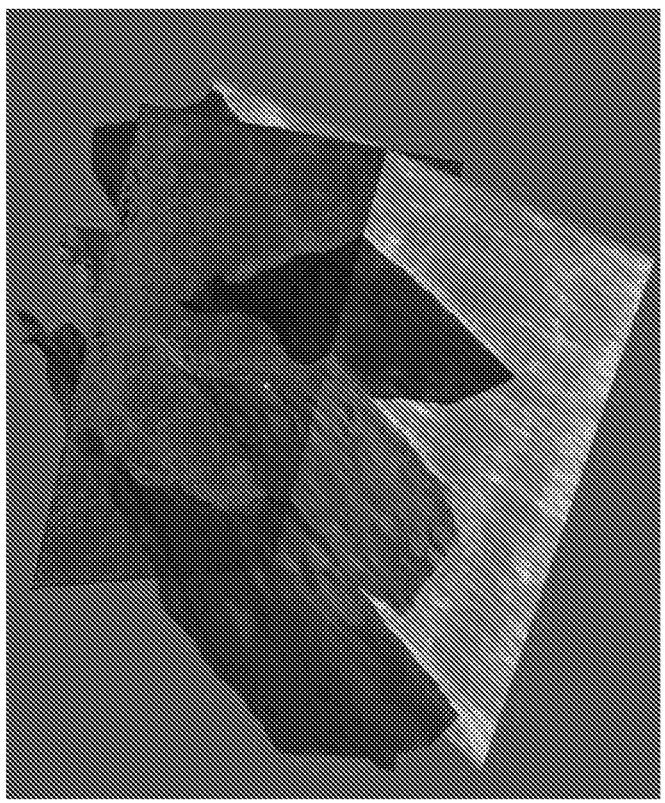
FIG. 13b is an image of a final result of a surface extraction method according to an embodiment of the present invention.
Figure 13A:
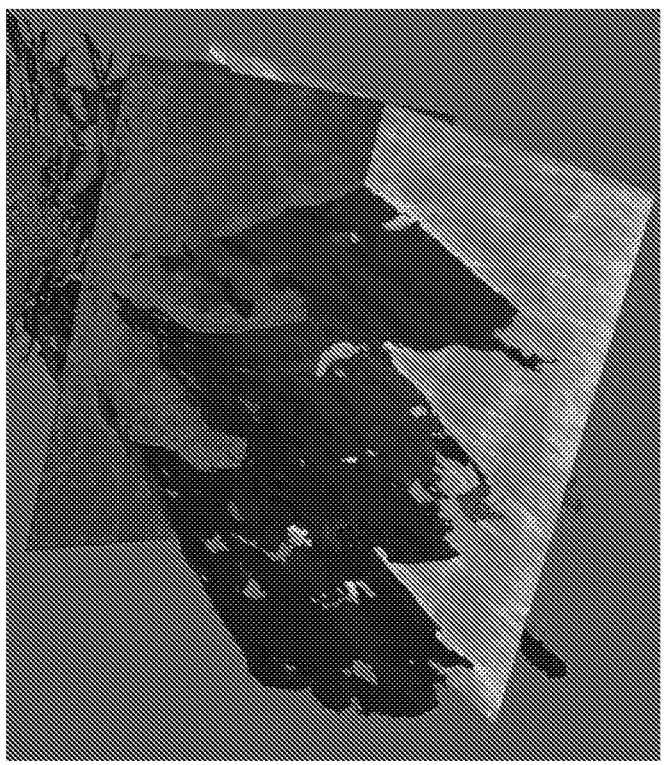
FIG. 13a is an image of a final result of a surface extraction method as known in the prior art.

FIG. 13a is an image that illustrates surface extraction according to a prior art method. The surface extracted in the embodiment shown in FIG. 13a includes a plurality of holes and detected clutter due to noise in the data. In contrast, the surface extracted in the embodiment shown in FIG. 13b is a smooth, simple surface that correctly identifies the structure. The images shown in FIG. 13b is the result of imaging of fault surfaces collected from seismic image data. However, the surface extraction method of the present invention is applicable in a variety of applications, including medical imaging (e.g., surface extraction of the outer wall of a patient's heart), as well as more general scientific imaging. In this way, the present invention describes a system and method of extracting surfaces—in particular surfaces with a free-boundary—without requiring the user to provide as an input the boundary of the surface. In particular, the present invention only requires as an input a seed point located on the surface to be extracted. In addition to the ridge extraction method described with respect to FIG. 4, other ridge extraction methods may be utilized.

Figure 14:
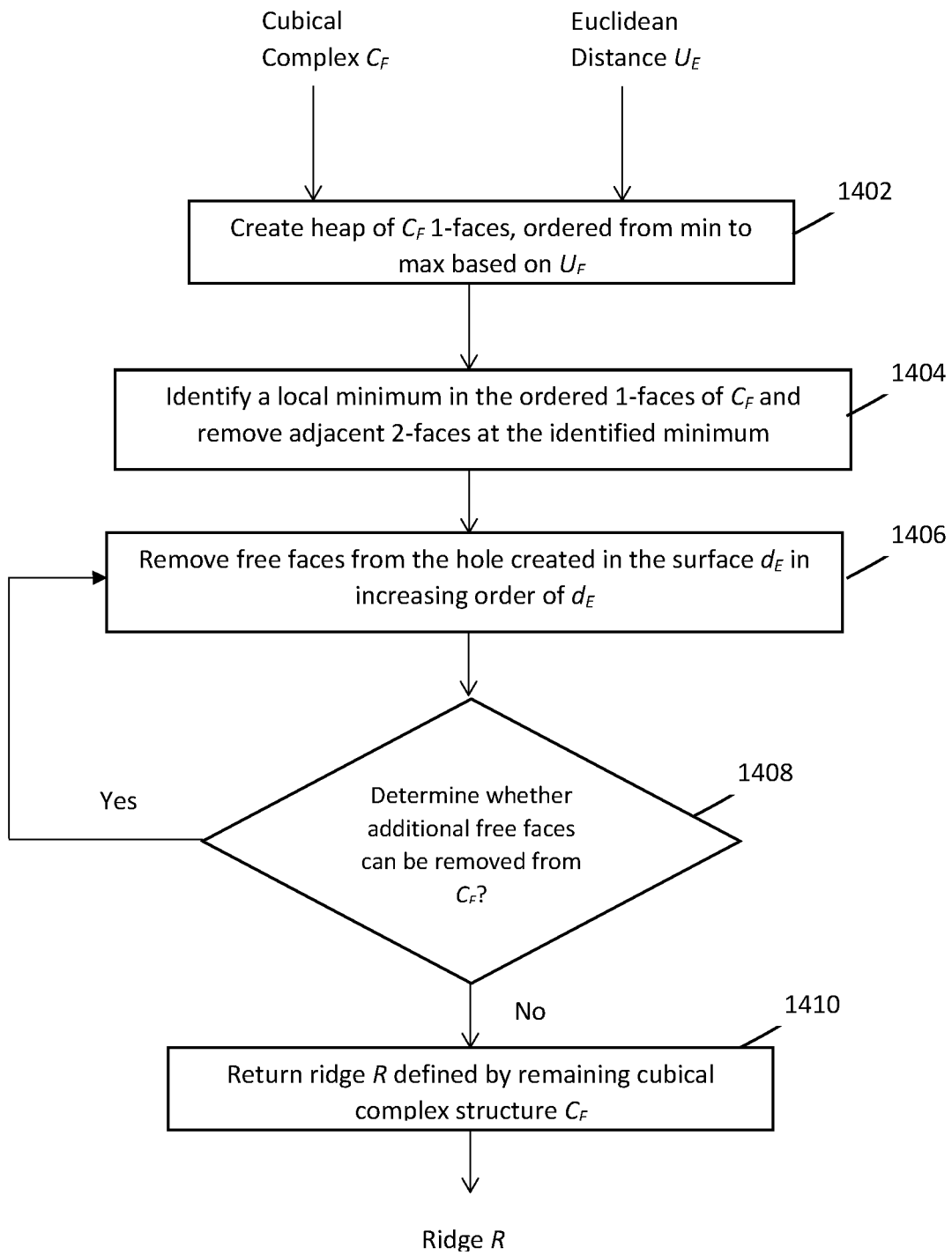
FIG. 14 is a flowchart illustrating steps employed to extract one or more ridges based on the Euclidean distance calculated by the propagated front according to another embodiment of the present invention.

FIG. 14 is a flowchart that illustrates an alternative method of extracting ridges to that shown in FIG. 4. In particular, in method described with respect to FIG. 14 utilizes the Morse complex and cubical complex theory to extract ridges of interest from the propagated front. The ridge extraction shown in FIG. 14 may be implemented by ridge extraction unit 122 (shown in FIG. 1).

Inputs provided once again include the cubical complex $C_F$ and the Euclidean distance $U_E$ representing the weighted minimum path length along any path from x to p, which is utilized to determine the Euclidean distance path length of the minimal weighted path—expressed as $d_E$. The minimum weighted path defined by $d_E$ is monitored by tracking the distance $U_E$ that solves the eikonal equation with the right hand side of Equation 1 (shown above) equal to "1", simultaneously in the solution for U.

The cubical complex $C_F$ is constructed as follows. Let $\mathbb{Z}_n = \{0, 1, n=1\}$ be a sampling of a coordinate direction of the image. As a result, the cubical complex $C_F$ contains all 2-faces f in $\mathbb{Z}_n^3$ between any 3-faces $g_1$, $g_2$ with the property that one of $g_1$, $g_2$ has all its 0-sub-faces with U<D and one does not, and each face f of $C_F$ has cost equal to the average of $U_E$ over 0-sub-faces of f.

Figure 15A:
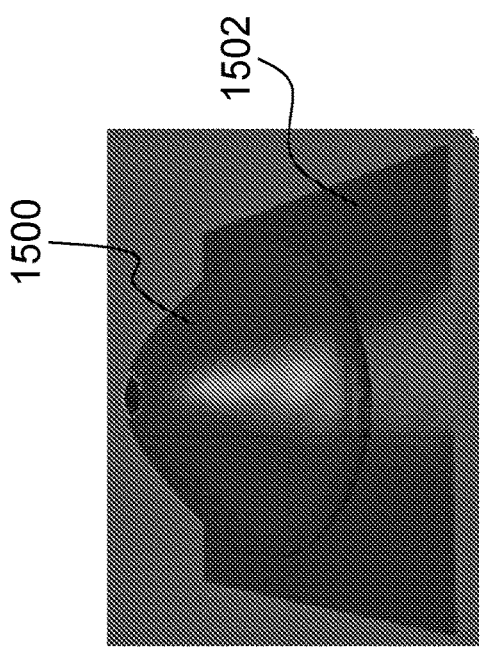
FIGS. 15a-15e are images illustrating ridge extraction based on the steps described with respect to FIG. 14.

At step 1402, a heap is created of 1-faces in the cubical complex $C_F$, wherein the 1-faces are ordered in the heap from minimum to maximum based on distance $d_E$ of locations x on the propagated front to the seed point p. An example is shown in FIG. 15a, which illustrates a front 1500 defined by the function $d_E$, which is continuous.

Figure 15B:
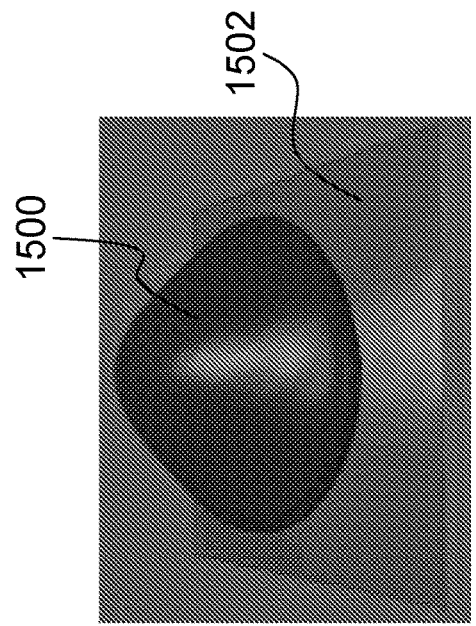

At step 1404, the ordered 1-faces cubical complex is utilized to identify a local minimum—located on top of the ordered heap. By removing the adjacent 2-faces of the identified local minimum, a hole is created in the surface $d_E$. The removed points associated with the local minimum form the ascending manifold for the local minimum. For example, FIG. 15b illustrates the creation of a hole in the top of the front 1500, which defined the local minimum of the ordered one-faces $U_E$. Because the front 1500 propagates faster along the surface 1502 to be extracted, the local minimum is not located on the ridge to be extracted.

Figure 15E:
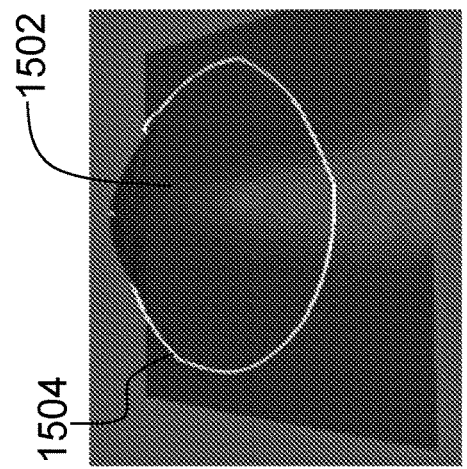
Figure 15D:
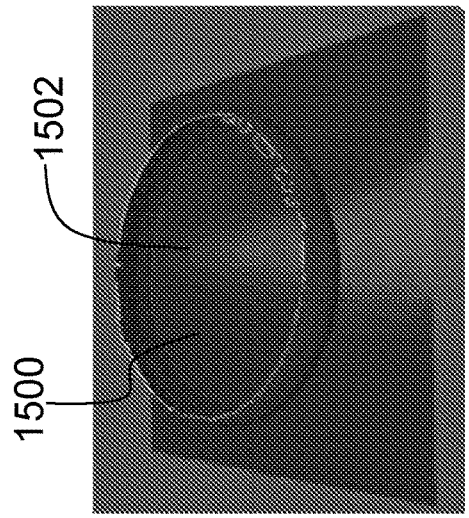
Figure 15C:
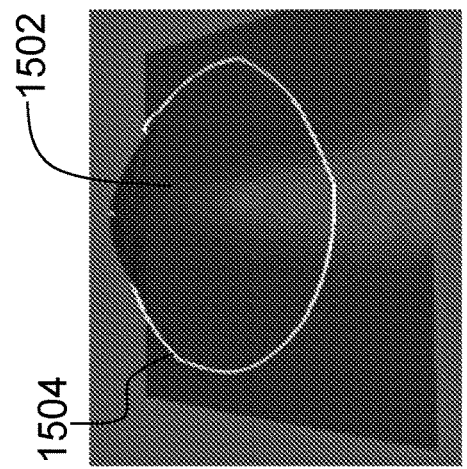

At step 1406, free faces are removed from the hole created in the surface $d_E$ in increasing order of $d_E$ so as to preserve homotopy equivalence of the complex. For example, the removal of these faces are illustrated in FIGS. 15c and 15d, in which the front 1500 is slowly removed until only a small region exists surrounding the surface 1502.

At step 1408, a determination is made whether additional faces can be removed without breaking homotopic equivalence (i.e., without removing isthmus faces that form the boundary of the ascending manifold). If so, then additional faces are removed at step 1406. If not, then the process stops at step 1410. The iterative removal of free faces at steps 1406 results in the removal of all 2-faces, while preserving the isthmus 1-faces. As a result, the cubical complex structure $C_F$ that remains at the end of the process is a lower dimensional structure than the original cubical complex $C_F$. For example, if cubical complex $C_F$ is a two-dimensional structure, the cubical complex that remains (e.g., $C_F'$) is a one-dimensional structure. For example, FIG. 15e illustrates the result of retracting the front to a final ring-shaped ridge 1504, which is a one-dimensional structure. In addition, as illustrated in FIG. 15e, the homotopic equivalence guaranteed by the method ensures that the resulting structure is connected.

An exemplary embodiment of an algorithm utilized to implement the method illustrated in FIG. 14 is reproduced below.

---

Morse Complex Ridge Extraction Algorithm
1:    Input: 2D cubical complex $C_F$ of FM front and Euclidean distance $U_E$ (cost on 1-faces in $C_F$)
2:    id ← 0
3:    Create heap of 1-faces ordered by $U_E$ (min at top)
4:    repeat
5:        Remove 1-face g from heap
6:        if g is a subset of two faces $f_1$ and $f_2$ in $C_F$ then
7:            Remove g; $f_1$; $f_2$ from $C_F$
8:            $l(f_1) \leftarrow l(f_2) \leftarrow$ id, id ← id + 1
9:            ** new id assigned for ascending manifold; hole created at local min
10:       else if (g, f) is a free pair in $C_F$ then
11:           Remove g, f from $C_F$
12:           $l(f) \leftarrow l(f_{adj})$ where $f_{adj} \supset g$ and $f_{adj} \notin C_F$
13:           ** labels face same as adjacent face containing g
14:       else if (f, g) is a free pair in $C_F$ then
15:           Remove g, f from $C_F$
16:       else if g is isthmus then
17:           $l(g) = \{l(f_1), l(f_2)\}$ where $f_1, f_2 \supset g$
18:           ** label is unordered list
19:       end if
20:    until heap is empty
21:    return $C_F$, l
22:        **Ridges, labels for 2-faces, ridges
23:    end procedure

---

In the Morse Ridge Complex Ridge Extraction algorithm shown above, the heap maintains a list of 1-faces, ordered by cost $U_E$. The computational complexity of the Morse Complex Ridge Extraction Algorithm is O(N log N), where N is the number of pixels. Typically, the number of faces utilized in the cubical complex $C_F$ is significantly less than the number of pixels, such that the computational complexity is less than O(N log N).

In the embodiment shown in FIGS. 15a-15e, the image data was clean, with the function $d_E$ defining a rather simple topology (e.g., cone-shaped), where the ridge is defined between the inside and outside of the cone. However, in other embodiments the image data may have more noise, which in turn can lead to the extraction of other ridge structures besides the main ridge of interest.

Figure 16:
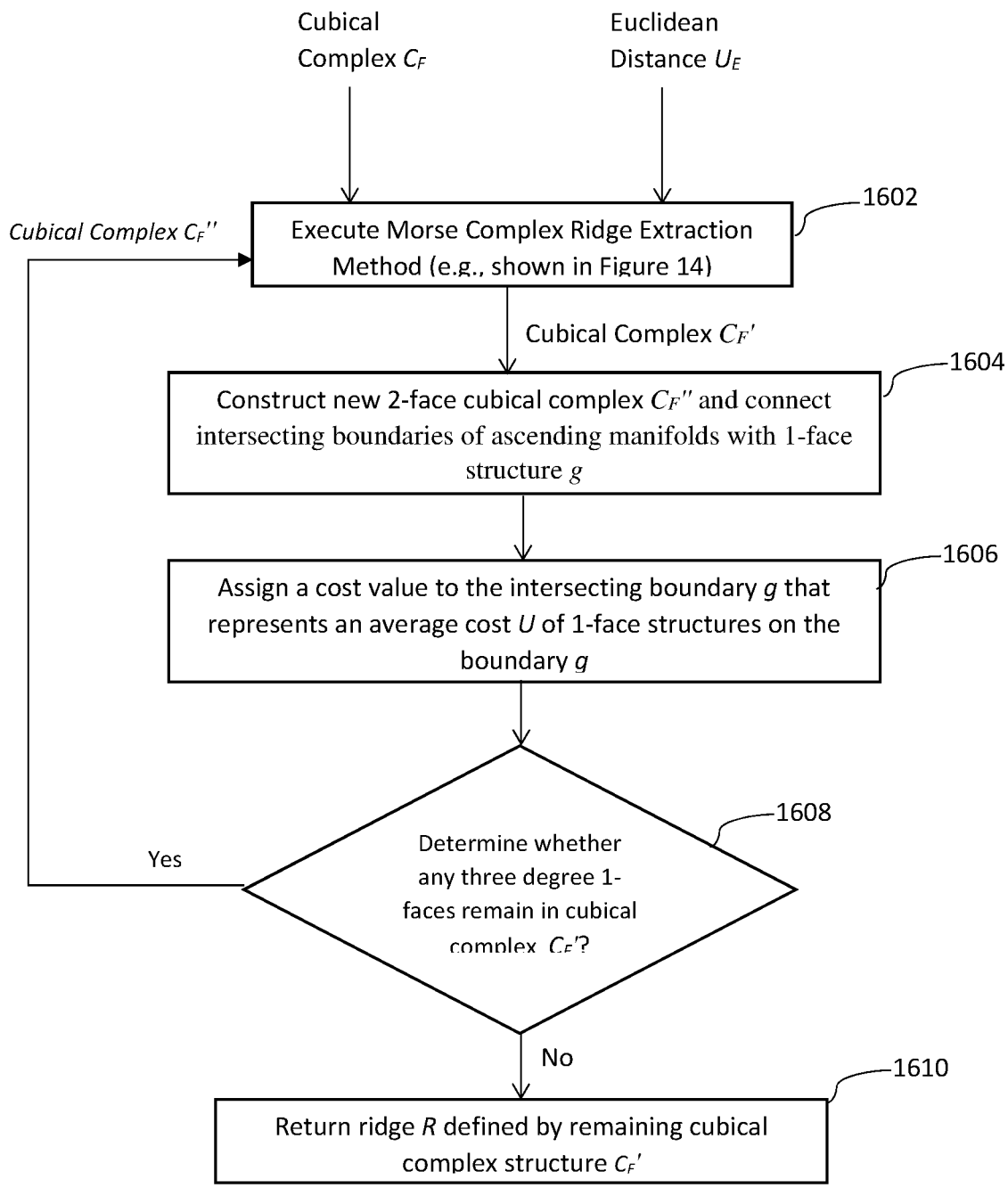
FIG. 16 is a flowchart illustrating steps employed to extract one or more ridges from a noisy image according to an embodiment of the present invention.

FIG. 16 is a flowchart that illustrates a method of ridge extraction utilized to handle noisy conditions. In this embodiment, the Morse Complex Ridge Extraction Algorithm described with respect to FIG. 14 is implemented iteratively to construct a new 2-faces complex for each ascending manifold computed. As discussed above, the Morse Complex Ridge Extraction Algorithm uses a local minimum to create an ascending manifold, resulting in extraction of a ridge located along the propagated front. However, in noisy data situation, a plurality of local minimum may exist. The embodiment described in FIG. 16 utilizes an iterative technique to extract a maximum or highest closed ridge curve from a plurality of ascending manifolds. In particular, whenever two corresponding ascending manifolds have intersecting boundaries, they are connected by a 1-faces structure (e.g., a line). Each 1-faces structure in this new complex is assigned a value to be the average of 1-faces in the common boundary between ascending manifolds. The Morse complex of this simplified complex is then iteratively applied until only a single loop remains, representing the ridge curve to be extracted.

Inputs provided include the cubical complex $C_F$ and the Euclidean distance $U_E$ representing the cost on 1-faces in $C_F$, as well as the propagated front $d_E$ to be analyzed. The cubical complex is constructed as discussed above with respect to FIG. 14.

At step 1602, the ridge extraction method described with respect to FIG. 14 is implemented. For example, in one embodiment this includes implementing the Morse Complex Ridge Extraction Algorithm described above, which creates a hole at a local minimum and removes free faces until no more faces can be removed while maintaining homotropic equivalence. The Morse Complex Ridge Extraction Algorithm returns a one-face complex structure (labeled $C_F'$ to distinguish from the complex structure $C_F$ provided as an input to the Morse Complex Ridge Extraction method).

At step 1604, a new 2-face cubical complex (labeled $C''_F$ to distinguish from the cubical complex structures $C_F$ and $C_F'$) is created, wherein the 2-face cubical complex includes a 2-face f for each unique 2-face id in l, and a 1-face g for each unique 1-face id in l. In addition, if the ascending manifolds have intersecting boundaries, they are connected by the 1-face structure g.

At step 1606, the intersecting boundary of the ascending manifolds—defined by a 1-face structure—is assigned a cost value U that represents an average cost of the 1-face structure along the intersecting boundary.

At step 1608 a determination is made whether any three degree 1-faces remain in the cubical complex $C_F'$. If three degree 1-faces remain in the cubical complex $C_F'$, then the process repeats at step 1602 with the new cubical complex $C_F'$ provided as an input to the Morse Complex Ridge Extraction Algorithm. If not, then the method ends at step 1610, wherein cubical complex $C_F'$ is returned, representing the desired ridge R to be extracted. In this way, the process repeats until only a single loop remains (i.e., only 2 degree 1-faces), which represents the ridge to be extracted.

FIGS. 17a-17e illustrate the iterative ridge extraction technique discussed with respect to FIG. 16. FIG. 17a illustrates the relatively noisy topographical data provided as an input to the ridge extraction method. FIG. 17b illustrates construction of a new cubical complex with a 2-face for each ascending manifold computed, as well as 1-face structures connecting 2-face structures if two corresponding ascending manifolds have intersecting boundaries. Although not shown, each of the 1-face structures in this new cubical complex is assigned a value to be the average of the 1-faces in the common boundary between ascending manifolds. The Morse complex of this simplified cubical complex is then computed, until only a single loop remains, as illustrated in FIG. 17e.

An exemplary embodiment of the algorithm utilized to implement the method illustrated in FIG. 16 is reproduced below.

```
Highest Closed Ridge Curve Extraction
 1:    Input: 2D cubical complex C_F of FM front and Euclidean
       distance U_E
 2:    repeat
 3:        ( C_F', l) = MORSE COMPLEX (C_F, U_E)
 4:            ** Call to Morse Complex Ridge Extraction Algorithm
discussed above
 5:        Create 2-cubical complex C''_F with
 6:            a 2-face f for each unique 2-face id in l
 7:            a 1-face g for each unique 1-face id in l
 8:            g joins f_1 and f_2 if l(g) = {l(f_1), l(f_2)}
 9:        for g each 1-face in C''_F do
10:            R = {g' ∈ C'_F : l(g') = l(g)}
11:            U'_E(g) ← average of U_E along R
12:        end for
13:        C_F ← C''_F, U_E ← U'_E
14:    until no degree three 1-faces in C'_F
15:    return C'_F
16: end procedure
```

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method of extracting a closed space curve that forms a boundary of a surface in three dimensions, the method comprising:
   receiving as inputs an image comprised of a plurality of pixels x, and a single seed point p located on the closed space curve;
   propagating a front outwardly from the single seed point p, wherein front propagates more quickly when propagating along the surface; and
   constructing a two dimensional cubical complex of the propagated front and extracting a ridge curve from the propagated front through ordered removal of free faces from the two dimensional cubical complex based on distance from the single seed point p;
   wherein the extracted ridge curve is of a lower dimension than the propagated front and wherein the extracted ridge curve and the propagated front are homotopy equivalent.

2. The method of claim 1 wherein constructing the two-dimensional cubical complex includes puncturing the cubical complex at two locations located at local minimas from the seed point p, wherein the ordered removal of free faces from the cubical complex begins at the two local minimas.

3. The method of claim 1, wherein extracting the ridge curve further from the propagated front further includes sorting 1-faces included in the cubical complex from minimum to maximum based on calculated distance from the seed point p.

4. The method of claim 3, wherein extracting the ridge curve from the propagated front through the ordered removal of free faces from the cubical complex continues until no free pairs are left in the cubical complex.

5. The method of claim 1, wherein constructing a two-dimensional cubical complex of the propagated front and extracting a ridge curve from the propagated front is implemented iteratively.

6. The method of claim 5, wherein for each iteration, the extracted ridge curve is utilized to construct a new 2-face cubical complex, wherein the new 2-face cubical complex intersecting boundaries of ascending manifolds are connected by 1-face structures.

7. The method of claim 6, wherein the 1-face structures are assigned a cost value that represents an average cost of 1-face structures on the boundary.

8. The method of claim 7, wherein the iterative process repeats, with the new cubical complex is provided as an input for extraction of a ridge curve.

9. A method of extracting a boundary of a surface in three dimensions, the method comprising:
   receiving as inputs an image comprised of a plurality of pixels x, and a single seed point p located on the surface to be extracted;
   propagating a front outwardly from the single seed point p over a period of time, wherein front propagates more quickly when propagating along the surface;

constructing a two dimensional cubical complex of the propagated front at intervals over the period of time the front is propagated; and extracting a ridge curve from the propagated front at each of the intervals through ordered removal of free faces from the two dimensional cubical complex based on distance from the single seed point p, wherein a plurality of ridge curves are extracted based on the propagated front over the period of time;

detecting a surface boundary based on the plurality of extracted ridge curves; and extracting the surface boundary by removing points in the image not located on the surface boundary.

10. The method of claim 9, wherein extracting the ridge curve further from the propagated front further includes sorting 1-faces included in the cubical complex from minimum to maximum based on calculated distance from the seed point p, and then extracting the ridge curve from the propagated front through the ordered removal of free faces from the cubical complex in ascending order until no free pairs are left in the cubical complex.

11. The method of claim 9, wherein constructing a two-dimensional cubical complex $C_F$ of the propagated front and extracting a ridge curve from the propagated front is implemented iteratively.

12. The method of claim 11, wherein for each iteration, the extracted ridge curve is utilized to construct a new 2-face cubical complex, wherein the new 2-face cubical complex intersecting boundaries of ascending manifolds are connected by 1-face structures, wherein the 1-face structures are assigned a cost value that represents an average cost of 1-face structures on the boundary.

13. The method of claim 12, wherein the iterative process repeats, with the new cubical complex is provided as an input for extraction of a ridge curve until no three degree 1-faces remain in the cubical complex.

14. The method of claim 9, wherein ridge curve extraction continues until the distance between adjacent ridge curves is sufficiently small, wherein the surface boundary is detected based on this distance determination.

15. The method of claim 9, wherein extracting the boundary surface includes sorting a 3D cubical complex of the image in decreasing order based on distance to the seed point p, and removing free faces from the 3D cubical complex until no additional free pairs can be removed without puncturing the surface boundary.

* * * * *